United States Patent
Ghosh et al.

(10) Patent No.: US 7,393,440 B2
(45) Date of Patent: Jul. 1, 2008

(54) HYDROGEN GENERATION SYSTEM

(75) Inventors: Debabrata Ghosh, Vancouver (CA); Asoke Chandra Das Chaklader, Vancouver (CA); Zhaolin Tang, Vancouver (CA); Zhong Xie, Vancouver (CA)

(73) Assignee: National Research Council of Canada, Ottawa (CA)

( * ) Notice: Subject to any disclaimer, the term of this patent is extended or adjusted under 35 U.S.C. 154(b) by 346 days.

(21) Appl. No.: 11/156,548

(22) Filed: Jun. 21, 2005

(65) Prior Publication Data

US 2006/0249393 A1 Nov. 9, 2006

Related U.S. Application Data

(60) Provisional application No. 60/678,800, filed on May 9, 2005.

(51) Int. Cl.
*C25B 9/00* (2006.01)

(52) U.S. Cl. .............. 204/275.1; 204/232; 204/267; 204/270; 204/272; 204/278; 204/278.5; 204/248; 429/21; 429/122; 429/165

(58) Field of Classification Search ............ 204/232, 204/267, 270, 275.1, 278, 278.5, 248, 272; 429/21, 122, 165
See application file for complete search history.

(56) References Cited

U.S. PATENT DOCUMENTS

| | | | |
|---|---|---|---|
| 3,036,141 A | 5/1962 | Goldenberg et al. ...... 429/218.1 |
| 3,036,142 A | 5/1962 | Goldenberg et al. ......... 429/81 |
| 3,256,504 A | 6/1966 | Fidelman .................. 204/248 |
| 3,648,668 A * | 3/1972 | Pacheco ..................... 123/3 |
| 3,716,416 A | 2/1973 | Adlhart et al. ............... 429/23 |
| 3,884,820 A * | 5/1975 | Miller et al. ............... 508/521 |
| 3,891,458 A * | 6/1975 | Eisenberg ................ 429/345 |
| 3,892,653 A * | 7/1975 | Pacheco .................. 204/238 |
| 3,897,267 A * | 7/1975 | Tseung et al. ............. 607/35 |
| 3,957,483 A | 5/1976 | Suzuki .................... 427/180 |
| 4,040,938 A | 8/1977 | Robertson |
| 4,264,362 A | 4/1981 | Sergev et al. ............... 75/243 |
| 4,340,580 A | 7/1982 | Suzuki .................... 423/657 |
| 4,356,163 A | 10/1982 | Davidson ................ 423/648.1 |
| 4,795,537 A | 1/1989 | Timewell |
| 5,089,107 A | 2/1992 | Pacheco ................. 204/230.2 |
| 5,514,353 A | 5/1996 | Adlhart .................. 422/239 |

(Continued)

FOREIGN PATENT DOCUMENTS

| | | |
|---|---|---|
| JP | 5 719 1203 A2 | 11/1982 |
| JP | 2003 212501 A2 | 6/2003 |
| WO | WO95/03637 | 2/1995 |

OTHER PUBLICATIONS

"New Aluminum Alloy Generates Hydrogen On-Demand", May 20, 2007, Purdue University.
"AirGen Tests Ambient temperature On-Demand Hydrogen generator" Feb. 15, 2006, AirGen.
Cathodic Dissolation . . . Azani et al., J. EL. Chem. 56(2004) 1-7.

*Primary Examiner*—Bruce F. Bell
(74) *Attorney, Agent, or Firm*—T. Wayne Anderson

(57) ABSTRACT

The present invention provides a system for generating hydrogen gas in an aqueous solution based electrolytic or galvanic cell wherein the cathode is made from aluminum or an aluminum alloy. In a preferred arrangement the cell is a galvanic cell and cathode is made from aluminum or aluminum alloy and the anode is made from magnesium or magnesium alloy.

18 Claims, 10 Drawing Sheets

U.S. PATENT DOCUMENTS

| | | | |
|---|---|---|---|
| 5,593,640 A | 1/1997 | Long et al. | 422/111 |
| 6,113,806 A | 9/2000 | Thomas | 252/188.25 |
| 6,322,723 B1 | 11/2001 | Thomas | 252/188.25 |
| 6,440,385 B1 | 8/2002 | Chaklader | 423/657 |
| 6,582,676 B2 | 6/2003 | Chaklader | 423/648.1 |
| 2004/0009392 A1* | 1/2004 | Petillo et al. | 429/122 |
| 2004/0118145 A1 | 6/2004 | Takasugi et al. | 62/335 |
| 2005/0042150 A1 | 2/2005 | Griffin | |
| 2006/0180464 A1 | 8/2006 | Griffin | |
| 2006/0188436 A1 | 8/2006 | Griffin | |

* cited by examiner

HYDROGEN GENERATION SYSTEM

This application claims the benefit of U.S. Provisional application No. 60/678,800 filed 9 May 2005.

FIELD OF INVENTION

The present invention relates to a hydrogen generating system, more particularly to the generation of hydrogen from water using an electrochemical system.

BACKGROUND OF THE PRESENT INVENTION

Attempts to generate hydrogen have been extensively pursued by a large number of companies in all industrial countries, because hydrogen is considered by many to be the fuel of the future for its abundant occurrence in nature as water and the non-toxic by-product generated (water). Large quantities of hydrogen may be generated primarily from two sources: (1) from hydrocarbons and (2) water.

Generation of hydrogen from hydrocarbons, and/or methanol, is not green house gas-free as it produces carbon dioxide as byproduct. Of these two, only water, as the source of hydrogen, is pollution free. Generally, hydrogen generation from water is either by electrolysis or by water split reactions. Electrolysis involves use of electricity in splitting water. Pollution-free generation of electricity is only possible if renewable energy sources such as hydroelectricity, wind, solar, etc. are used. Even electric power generation using nuclear power station cannot be considered completely pollution-free.

For large scale commercialization of Proton Exchange Membrane (PEM) fuel cells, an easily available source of hydrogen gas is required. To meet this requirement i.e., hydrogen on demand several methods are currently employed such as, pressurized hydrogen gas or liquid in a tank or hydrogen stored chemically as a hydride or generation of hydrogen in situ by catalytic reforming of natural gas and/or methanol or other hydrocarbons. Hydrogen gas stored in a tank or as hydride obviously requires its generation from other sources.

Attempts to generate hydrogen from water on demand by water split reaction have been partly successful in some newer developments, which have been disclosed in recent patents (U.S. Pat. No. 6,440,385 B1, issued on Aug. 27, 2002 and U.S. Pat. No. 6,582,676 B2, issued on Jun. 24, 2003). In these patents aluminum was used to generate hydrogen from water, but is not very efficient, as this method requires large concentration of other materials in Al to accomplish the water split reaction.

There are several methods of generating hydrogen from water through chemical reaction described in the Patent literature, however, most of them suffer from cost and environmental problems (see U.S. Pat. No. 4,356,163; 5,514,353; 3,716,416 and 5,593,640).

There are a large number of patents for generating hydrogen from water using aluminum metal as the major consumable component. However, most of these involve other chemicals (activators) in the water to react with aluminum to generate hydrogen. The technology can be divided into several groups.

1. Al in water with NaOH and KOH
2. Alloying Al with other metals (including mechanical alloying) and then adding to water
3. Al with amalgam of Hg and other metals in water
4. Al in an aqueous electrolyte solution as an anode.

In the prior art, all methods have some drawbacks such as use of environmentally unfriendly chemicals, high cost, no control over hydrogen generation rate, etc.

Various concepts have also been advanced on how to generate hydrogen from magnesium using an electrolyte, see for example U.S. Pat. No. 6,113,806 dated Sep. 5, 2000 and U.S. Pat. No. 6,322,723 dated Nov. 27, 2001 both issued to Stephen R. Thomas describes the use of particulate metal compositions of magnesium with iron, aluminum and zinc added to water with alkali salt.

US 2004/0018145 A1 Patent dated Jan. 29, 2004—T. Suzuki et al., teaches the use of an aggregate consisting of Mg alloyed with Ni, Fe, V, Mn, Ti, Cu, Ag, Ca, Zn, Zr, or Al and other hydrogen generation material such as, NaH, Na, Ca, D, Sr, Li, or Be and hydrides with water. U.S. Pat. No. 3,957,483 dated 1976, also issued M. Suzuki, uses Mg composites having Fe, Zn, Cr, Al, and Mn added to water.

JP Patent #2003212501 A2 dated Jun. 30 2003—K. Izuru et al., teaches the use of aggregates formed from magnesium grains and catalyst metal particulates which are added to water to generate hydrogen. Metal particulates include Ni, Ni alloy, Fe, Fe alloy, V, V alloy etc.

The concept of generating hydrogen electrochemically is well known and has been described in the literature. U.S. Pat. No. 3,648,668 Mar. 14, 1972 to Pacheco teaches the generation of hydrogen using a magnesium (Mg) electrode and a carbon electrode in sea water or a salt solution and controlling production by a potentiometer which in turn is controlled by pressure sensor that senses the pressure of the produced and stored hydrogen gas.

U.S. Pat. No. 3,892,653 dated July, 1975; to F. Pacheco, teaches the use of magnesium as an anode, stainless steel as cathode; and sea water as electrolyte. The electrolyte is circulated. No electric current used but electric power generated in the system was used for electrolyzing water U.S. Pat. No. 5,089,107 dated Feb. 18, 1992, F. Pacheco, describes an autoelectrolytic hydrogen generator system constituted by one or a plurality of similar cells wherein a galvanic arrangement of magnesium and aluminum plates of sacrificial elements as anode; stainless steel as cathode and sea water as electrolyte was used. When connected in short circuit causing a current to flow within the system and hydrogen production in situ commenced. Surplus electric energy of the system applied to an optional electrolyzer.

U.S. Pat. No. 4,340,580 dated Jul. 20, 1982, M. Suzuki, teaches generation of hydrogen using a Magnesium (Mg) electrode and another electrode in an electrolyte solution. An a.c. and d.c. voltage was applied.

U.S. Pat. Nos. 3,036,141 and 3,036,142 dated May 22, 1962 Goldenberg, describe magnesium galvanic cells comprising a magnesium or magnesium alloy anode, an aqueous electrolyte, and an inert cathode (steel or chrome plated steel) that were used to generate hydrogen ($H_2$). The hydrogen produce was used to agitate the electrolyte U.S. Pat. No. 3,256,504 dated Jun. 14, 1966 Fidelman, describes the production of hydrogen by reacting magnesium with water, the reaction being accomplished by galvanically coupling Mg with an active inert metal cathode in saline water.

WO 95/03637 Int. Publ date Feb. 2, 1995, S. Rosner, provides flow sheets and designed reactors (Fuel Cells) to generate hydrogen gas using a large number of previous patents.

US Patent Publ. #2004/0009392 A1 Publ. Date Jan. 15, 2004, P. J. Petillo and S. C. Petillo, teaches a Hydrogen generator that includes (a) an anode material (b) a cathode material and (c) an electrolyte; wherein the electrolyte comprises a metal hydride.

JP Patent #57191203 A2 dated Nov. 25, 1982, M. Suzuki, describes Mg being activated by contacting or electrically connecting with electroconductive matter and soaked in neutral aqueous electrolyte, esp. sea water. Thus, a 10 g Mg plate was rubbed with powder CuCl and soaked in 20% NaCl to generate hydrogen.

"Cathodic dissolution behaviour or an aluminum wire electrode in solution containing borate and sulfate ions" by Azumi et al. in the Journal of Electroanalytical Chemistry 567 (2004) 1-7 reports on the action on aluminum resulting in the evolution of hydrogen and the formation $Al(OH)_4$.

Aluminum has a tendency to be self protecting by forming an oxide that inhibits reactions required for the formation of hydrogen and thus in some cases is difficult, if not, impossible to use on an extended term basis.

Obviously much work has been done to develop hydrogen generation processes to provide hydrogen for a variety of different purposes including power generation by combustion. Some provide control systems and teach production of hydrogen on demand, however the rate of production from these processes is not always up to the required rate without providing a production unit of undue size.

BRIEF DESCRIPTION OF THE PRESENT INVENTION

It is an object of the present invention to provide an aqueous electrochemical system of obtaining hydrogen from aluminum.

It is a further object of the present invention to provide an aqueous galvanic system for generating hydrogen from aluminum.

It is the major object of the present invention to provide a galvanic system for generating hydrogen from water using aluminum or an aluminum alloy as the cathode and magnesium or magnesium alloy as the anode.

Broadly the present invention relates to an apparatus for generating hydrogen gas from water, comprising a container containing a water based electrolyte, an anode electrode and a cathode electrode positioned in spaced relationship in said electrolyte in said container to provide a cell, a controlling electric circuit electrically interconnecting said electrodes, an accumulator space for collecting hydrogen generated by said system and wherein said cathode is formed from aluminum or an aluminum alloy.

Broadly the present invention relates to a method for generating hydrogen gas from water, comprising a immersing an anode electrode and a cathode electrode formed from aluminum or an aluminum alloy, positioned in spaced relationship in a water based electrolyte to provide a cell, providing a controlling flow of electric current between said electrodes and collecting hydrogen generated.

In some cases said cell is an electrolytic cell and said controlling electric circuit applies potential to said electrodes to define said anode and cathode.

Preferably means are provided to selectively reverse the polarity of said electrodes.

Preferably both said anode and cathode are made from aluminum or aluminum alloy

Preferably said cell is a galvanic cell and said anode is formed from magnesium or magnesium alloy.

Preferably said electrolyte is sodium chloride solution in water.

Preferably said electrodes are in the form of a sandwich with an electrical insulating layer there between.

Preferably said sandwich is rolled up to a substantially cylindrical shape.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

Throughout this application the term cathode means the electrode at which reduction reaction takes place, the term anode means the electrode at which oxidation reaction takes place. In an electrolytic system current will be applied to the respective electrodes to define the anode and cathode. In a galvanic cell the electrode made from the more electronegative material will give up electrons and thus be the anode. In the preferred embodiment of the present invention employing a galvanic cell with magnesium (Mg) and aluminum (Al) electrodes the Mg is more electronegative and will give up electrons and thus act as anode and Al will act as cathode.

Figures 1, 1A:
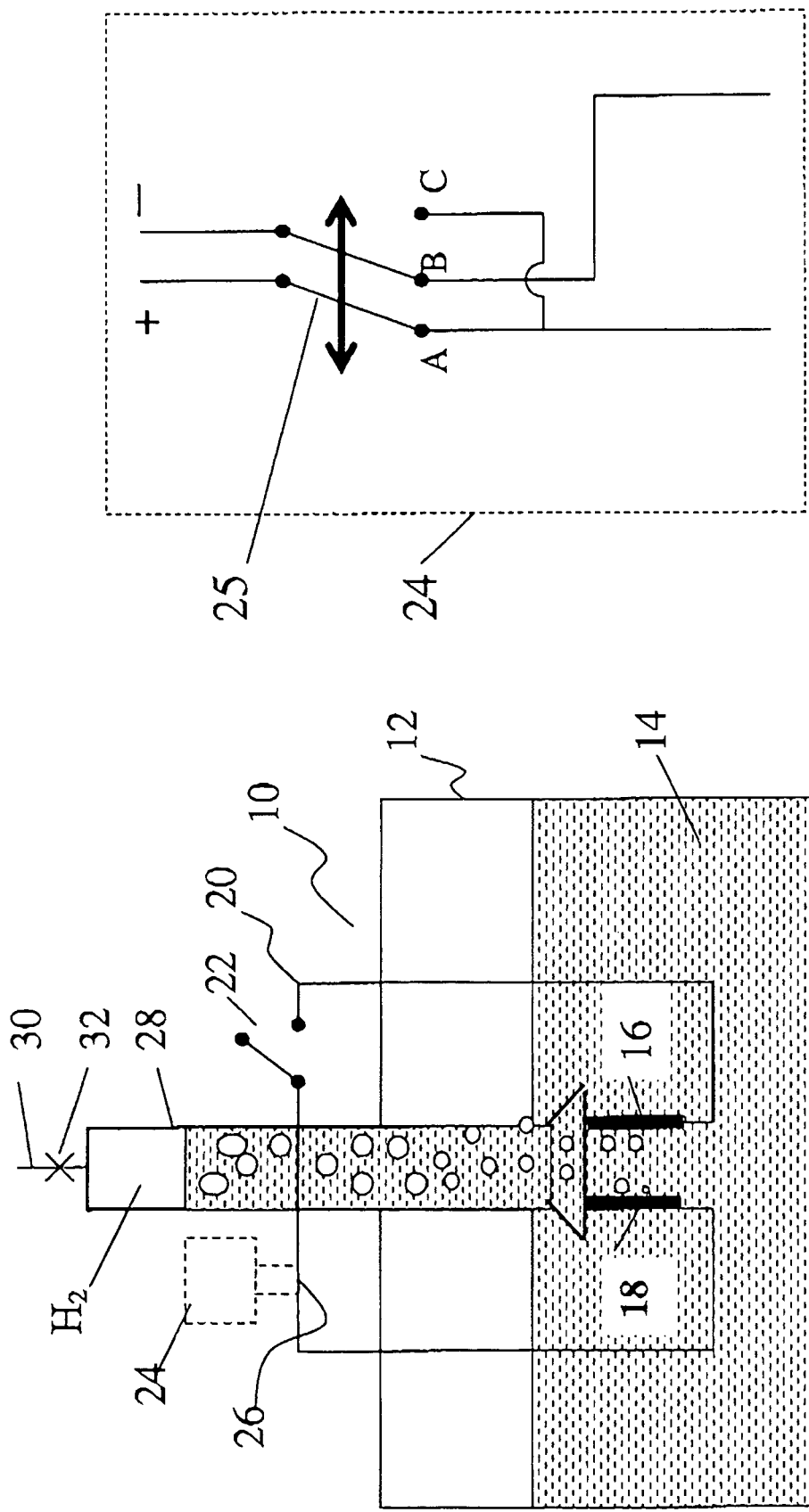
FIG. 1 is a schematic illustration of an electrolytic or galvanic cell incorporating the present invention.
FIG. 1A shows in more detail a polarity reversing system for use in an electrolytic cell system.

Turning to FIG. 1 the cell 10 as schematically illustrated includes a container 12 containing an aqueous electrolyte 14. Immersed in the electrolyte 14 are electrodes 16 and 18, electrode 16 is the cathode and electrode 18 is the anode (only one anode electrode and one cathode electrode are shown but obviously a number of different plates may be used as cathode and anode electrodes).

An external electric circuit schematically indicated by reference numeral 20 controllably interconnects the electrodes 16 and 18 via an on/off switch 22. If the cell 10 is an electrolytic cell a power source 24 is interposed in the circuit 20 and the circuit section 26 is eliminated so that the power source 24 is in series with the electrodes and applies current to the electrodes 16 and 18 to form them into an cathode and an anode.

As shown in FIG. 1A the power source 24 includes some form of direct current (dc) as indicated by the + and − terminals which connect to a two pole two position switch 25 which in position one as illustrated connects the + terminal to the terminal A leading to in the illustrated case electrode 18 so that it will have a positive charge as shown in FIG. 1 and substantially simultaneously connect the − terminal to terminal B leading to switch 22 and electrode 16 so that electrode 16 has a − charge as shown in FIG. 1. When the switch 25 is moved to its second position (not shown) the + terminal connects to terminal B and through switch 22 to electrode 16 making it + and substantially simultaneously the − terminal connects to terminal C which is connected to terminal A and to electrode 18 making it − (negative). With this arrangement by changing the position of the switch 25 the anode is converted to a cathode and vice versa depending on the position of switch 25.

The switch 25 may be timed to change positions from the position illustrated to the other position described and vice versa or change imposed manually or in any other suitable way and is used to better insure the two electrode are more evenly consumed. This is of particular advantage in electrolytic systems employing aluminum or aluminum alloy as both the anode and cathode.

If the cell 10 is functioning as a galvanic cell the power source 24 is omitted and the circuit section 26 is retained i.e. the electrode 18 is connected to one side of the switch 22 and the electrode 16 to the other side.

In the illustrated system a tower 28 is provided above the electrodes 16 and 18 in a position to receive hydrogen ($H_2$) as generated at the electrodes (16 and 18) and rising from the electrolyte 14 and to provide a storage space for the generated $H_2$ and from which the $H_2$ may controllably be withdrawn via the line 30 and control valve 32.

It is important to the present invention that the cathode electrode be made of aluminum (Al) or a suitable aluminum alloy as will be discussed in more detail below. In an electrolytic cell the anode may be of any suitable metal but the most suitable material for use as the anode has been found to be aluminum and suitable alloys thereof as will be discussed in more detail below. The use of Mg and/or its alloys as the anode is particularly important if the cell 10 is a galvanic cell.

Figure 2:
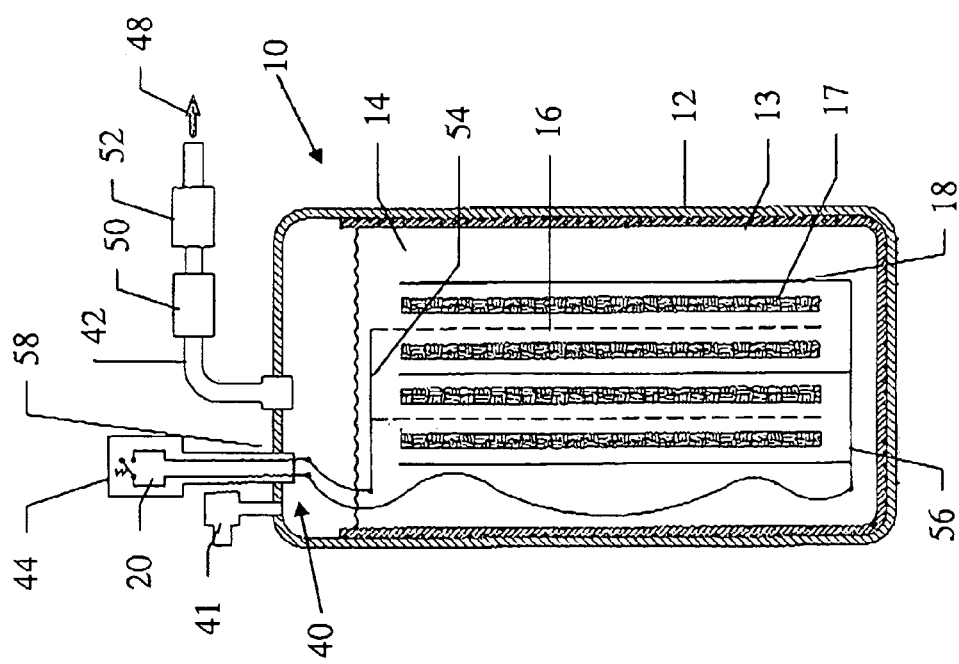
FIG. 2 is a schematic illustration of a galvanic cell illustrating the present invention.

A more complete version of the invention is schematically shown in FIG. 2. In this version the container 12 of the cell 10 is provided with a plurality of cathode electrodes 16 with anode electrodes 18 interposed there between at least partially submerged in an aqueous electrolyte 14 (preferably a salt water solution). Interposed between adjacent faces of adjacent electrodes 16 and 18 is electrical isolator material 17 that electrically insulates the adjacent electrode plates 16 and 18, while permitting the required flow of electrolyte 14. The container 12 has an insulating liner 13 and its upper portion 40 functions to collect the generated $H_2$. A suitable pressure relieve valve 41 will normally be provided to relieve the pressure in the system should it exceed a preset value.

Generated $H_2$ leaves the space 40 in the illustrated version by a fitment 42 one end of which connects to space 40 and the other to a suitable mist separator 50 and a desiccant filter 52 arranged in series and then to the output line as represented by the arrow 48 (equivalent to line 30) that will normally include a regulating valve (not shown) equivalent to valve 32 described above.

The electrical insulator 17 may be made of any suitable material such as ceramics, plastics and polymer but preferably will be plastics and to provide the desired spacing between the anode and cathode electrodes 18 and 16 which normally will be as close as practical without shorting of the electrodes and while being sufficiently wide or the electrodes having a construction where any precipitate formed does not impair the operation of the system.

The electrodes 16 are connected to a bus bar schematically indicated at 54 and the electrodes 18 with separate bus bar schematically indicated at 56 both or which pass through the electrical feed through schematically indicated at 58 and connect the electrodes 16 and 18 into the circuit 20.

The electrical circuit 20 in the arrangement of FIG. 2 also includes pressure sensor switch 44 which breaks the circuit 20 (i.e. functions similar to switch 22 and may be in series with a manual switch equivalent to switch 22 (not shown in FIG. 2). The switch 44 is used to automatically turn the system on or off depending on the pressure so that hydrogen may always be available at a selected pressure and there is no danger of the pressure becoming excessively high. In an electrolytic system the switch functions to stop current flow to the electrodes to halt production and in a galvanic system to break the circuit between the electrodes to stop production.

Figure 3:
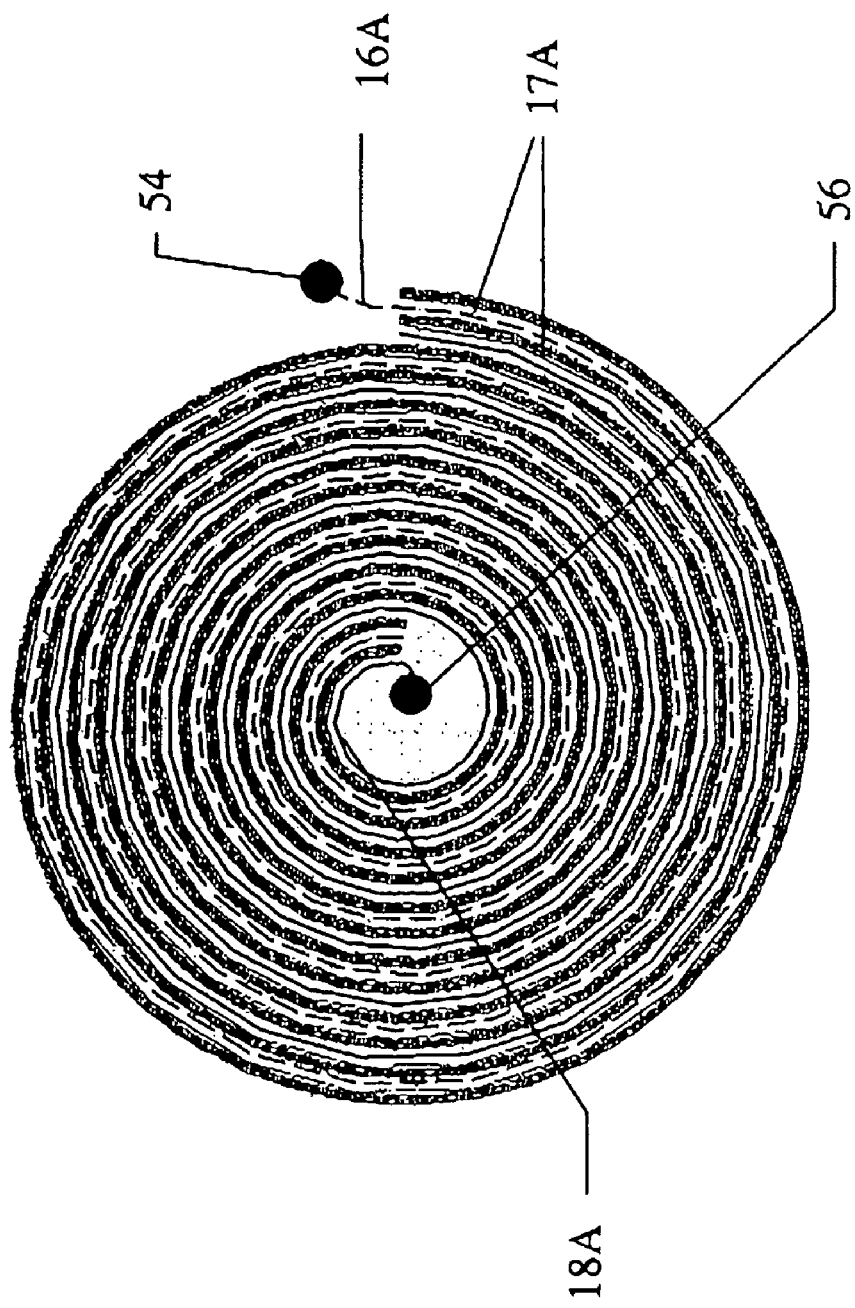
FIG. 3 is a schematic illustration of a wound form of electrode arrangement suitable for the present invention.

FIG. 3 is a schematic cross section schematically illustrating how a wound electrode system might be constructed with the electrodes equivalent to 16 and 18 being in the form of elongated electrode elements 16A and 18A formed into a sandwich with the insulating material 17A equivalent to the insulting material 17 there between and then rolled into a substantially cylindrical form to be received in a substantially cylindrical container not shown equivalent to the container 12. Suitable bus bars 54A and 56A will connect to each of the electrode elements to the circuit 20 (not shown in FIG. 3). There may be a plurality of connections to the bus bars located at spaced intervals along the lengths of their respective element 16A and 18A.

Any suitable aqueous electrolyte may be used as will be discussed below and any suitable electrode structure may be used such as a mesh or lattice, etc. It is important that the electrode structures permit separation of any precipitates formed and permit easy passage to the $H_2$ generated into a reservoir equivalent to that illustrated at 40. The spacing between electrodes 16 and 18 may be optimized as above described for a given system.

The term aluminum alloy includes most aluminum alloy(s) that have significant amount of available aluminum to generate $H_2$. Similarly the term magnesium alloy(s) that have significant amount of available magnesium to generate $H_2$ and further include less corrosive elements that tend to maintain the integrity of the electrode.

Electrolytic Cell System

The present invention as an electrolytic cell employs aluminum or aluminum alloy as the cathode and preferably aluminum or aluminum alloy as the anode to provide a method for generating hydrogen from water on demand. The aluminum metal or aluminum alloy generate hydrogen in the presence of water and function as consumable electrodes (preferably both cathode and anode) in an aqueous electrolyte when passing a small electric current between the electrodes. When the current flow stops, hydrogen generation stops.

Examples Including Results Obtained for the Electrolytic System of the Present Invention In a series of experiments which follow, aluminum metal or aluminum alloys were used both as cathode and anode and proved to be the best system for maximum hydrogen generation as compared to where other metals were used as anode (stainless steel, platinum (Pt), etc). Aluminum metal or Al alloys can be in a variety of forms such as sheet, rods, wires, mesh, foam, honeycomb, etc. These materials can be primary alloy or secondary recyclable materials, such as aluminum beverage cans, aluminum kitchen products etc.

Quantitative Estimation of Gas Generated

In order to collect the gas generated in the system a specimen holder (not shown) was made from a piece of Plexiglas. The specimen holder was about 2.3 cm wide, ~1.0 cm thick and ~15 cm long. Three slots of about 1 mm wide and about 2 mm deep were cut on the wide surface and at the center of each slot a hole was drilled to connect the specimen with an insulated Pt wire, which could be connected with a power supply outside the gas collection system. The gas collection system was essentially an inverted electrolyte-filled measuring cylinder, positioned on the top of the two electrodes. The generated gas was collected on the top of the cylinder and recorded visually as a function of time. The surface area of both electrodes was kept constant ~9 cm$^2$ Gas collected as a function of:
1. Different aluminum metal or aluminum alloy materials as cathode
2. Different electric current
3. Temperature
4. Aluminum metal or aluminum alloys as anode and cathode.

After a few tests with stainless steel as anode, when coloration of solution was encountered, a Pt-mesh was used as the anode for subsequent tests. The tests with Pt as anode were carried out to compare the amount of $H_2$ generated with this system versus aluminum both as anode and cathode. For cathode, Al baking plate, Al foil, Budweiser Al-can, Pepsi cola Al-can and an aluminum alloy (A6061) were used.

Series A

Next, three different aluminum specimens (1) baking pan, (2) alloy A6061 and (3) Budweiser-can were used to generate hydrogen as a function of electric current at different temperatures. The results are shown in Table 1. During these tests Pt mesh was used as the anode.

TABLE 1

Test Results of Al and Al-alloys for $H_2$ Generation with Pt as anode in 1M NaCl

| Cathode/anode | Time/ min | 20° C./ $H_2$ ml | 45° C./ $H_2$ ml | 60° C./ $H_2$ ml | Potential/ Volts | Current/ mA |
|---|---|---|---|---|---|---|
| a). Al baking plate/Pt mesh | 30 | 14 | 20 | 23 | 2.4 | 20 |
| | " | 21 | 27 | 32 | " | 40 |
| | " | 28 | 42 | 42* | " | 60 |
| b). Budweiser can/Pt mesh | 30 | 12 | 15 | 24 | 2.4 | 20 |
| | " | 18 | 21 | 33 | " | 40 |
| | " | 27 | 33 | 45 | " | 60 |
| | " | 30 | 44 | 52 | " | 80 |
| c). A6061 Al alloy/Pt mesh | 30 | 11 | 18 | 22 | 2.4 | 20 |
| | " | 18 | 23 | 26 | " | 40 |
| | " | 28 | 39 | 42 | " | 60 |
| | " | 35 | 49 | 54 | " | 80 |

*Indicates that the specimen was very thin and not enough Al was present for reaction to generate hydrogen In Table 1 it can be seen that there is definitely an effect of increasing current and/or temperature on the generation of $H_2$ from water. When either the current or temperature was increased, there was more hydrogen generated from the system. This is true for all three types of aluminum tested aluminum beer cans (Budweiser, baking plate) and an aluminum alloys A6061. It is apparent that there is not much difference in the hydrogen out put for these materials; Al baking pan, beer can and alloy A6061 under identical conditions of testing. All these materials contain over 98-99% of aluminum.

Series B

Aluminum metal or aluminum alloy plates were used both as anode and cathode in this series of tests. This was expected to reduce the electrochemical potential of two dissimilar metals in the electrolyte, which is a significant benefit of using Al alloys both as cathode and anode, lowering the voltage and hence the power requirement for generation of hydrogen. The aluminum alloy A6061 was used as anode, and Al baking plate and Pepsi cola-can were used as cathode. The current was varied between 20 and 80 mA and also different temperatures were used to generate hydrogen. The results are shown in Table 2. Comparing with the previous data it is immediately apparent that the applied potential is reduced significantly, thus dramatically reducing the power required to generate hydrogen.

TABLE 2

Test Results of Al and Al-alloys for H2 Generation in 1M NaCl

| Cathode/anode | Time/ min | 20° C./ $H_2$ ml | 45° C./ $H_2$ ml | 60° C./ $H_2$ ml | Potential/ Volts | Current/ mA |
|---|---|---|---|---|---|---|
| a). Al baking plate/A6061 | 30 | 12 | 20 | 21 | 0.5 | 20 |
| | " | 22 | 30 | 37 | " | 40 |
| | " | 33 | 45 | 60 | " | 60 |
| | " | 48 | 60 | 72 | " | 80 |
| b). Pepsi cola can/A6061 | 30 | 12 | 18 | 20 | 0.8 | 20 |
| | " | 18 | 30 | 33 | " | 40 |
| | " | 27 | 40 | 51 | " | 60 |
| | " | 30 | 54 | 90 | " | 80 |

The above table shows that there was definitely some increase in the gas output in terms of the amount of hydrogen generation when an aluminum alloy was used as anode, instead of Pt mesh. Visually it was also observed that small bubbles of gas were formed on the anode, although mostly gas was produced on the cathode.

Series C

In this series of tests both anode and cathode were of same aluminum alloy materials, such as A6061-A6061 and (Pepsi-cola) Al-can—(Pepsi-cola) Al-can and the electrolyte solution was 2M NaCl in water. This was to study if there was any effect of increasing the electrolyte strength on the gas generation. The results are shown in Table 3.

When the data in Table 3 are compared with that of in Table 1, it can be easily seen that for the same material Al alloy A6061 at 20° C., 40° C. and 60° C. there has been significant increase in hydrogen generation. This may be due to two effects (1) higher electrolyte concentration 2M vs. 1M solution (used previously) and (2) corrosion of both anode and cathode (Al alloy) when electric current was passed through the system. As previously noted in Series B tests, it was noticed that there was some gas generation from the anode also when aluminum was used as the anode.

TABLE 3

Test Results of Al and Al-alloys for $H_2$ Generation in 1M NaCl

| Cathode/anode | Time/ min | 20° C./ $H_2$ ml | 45° C./ $H_2$ ml | 60° C./ $H_2$ ml | Potential/ Volts | Current/ mA |
|---|---|---|---|---|---|---|
| a). Al6061 as both anode and cathode | 30 | 12 | 22 | 26 | 0.8 | 20 |
| | " | 20 | 37 | 40 | " | 40 |
| | " | 28 | 54 | 48 | " | 60 |
| | " | 38 | 63 | 64* | " | 80 |
| | " | 45 | 81 | 72* | " | 100 |

TABLE 3-continued

Test Results of Al and Al-alloys for $H_2$ Generation in 1M NaCl

| Cathode/anode | Time/ min | 20° C./ $H_2$ ml | 45° C./ $H_2$ ml | 60° C./ $H_2$ ml | Potential/ Volts | Current/ mA |
|---|---|---|---|---|---|---|
| b). Pepsi cola can as both anode and cathode | 30 " " " " | 10 18 27 39 40 | 18 27 40* 44* 54* | | 0.8 " " " " | 20 40 60 80 100 |

*Indicates that the plates was so thin there was not enough Al metal remaining to react and generate hydrogen Gas Analysis Doubts were expressed previously if there was also electrolysis occurring when electric current was passing through the system. This might be occurring simultaneously with the generation of hydrogen gas by the chemical reaction with aluminum. Mass spectrometric analyses on the collected gas were done and it was shown that the gas contains less than 1% oxygen in the system (in the range of ~0.7%). This oxygen may be from dissolved oxygen in water (as tap water was used during the tests). A plastic tube was introduced into the measuring cylinder, containing the gas generated and this was connected with the mass spectrometer. This line was mostly purged with $N_2$ to remove air from the line. Also, there may be some leakage in all the connections. These tests indicated that there was no water electrolysis in the system.

Reaction Product

The colloid material formed in the system when electric current was passed between two electrodes of Al as anode and cathode was filtered and dried to a powder. From the x-ray analysis of the powder, it was concluded that the by-product of reaction is aluminum monohydrate, formed by the following reaction.

$$Al+2H_2O \rightarrow AlOOH+3/2H_2$$

The aluminum mono-hydroxide (Boehmite) thus formed can be recycled and are environmental friendly. When the byproduct is calcined (dehydroxylated) $Al_2O_3$ will be formed, which in turn, can be converted back to aluminum metal in an electrolytic smelter.

The above results may be summarized as follows:

1. It has been conclusively proven hydrogen can be produced from water on demand (as and when required) by passing a small current through an aqueous electrolyte using aluminum metal or its alloy as cathode and preferably at both the anode and cathode.
2. In this invention, aluminum metals or aluminum alloys were used both as anode and cathode, which generate more hydrogen than when other metals are used as anodes.
3. The electrolyte can be water containing any water soluble salts such as NaCl, KCl, LiCl, etc. It can be simply sea water.
4. The hydrogen generation is based on an enviromentally friendly cost effective process wherein recycled raw materials may be used and by-products can be recycled.
5. The hydrogen output depends in part on the strength of the electric field and current. Higher the current higher the output of hydrogen.
6. Temperature has significant effect of hydrogen generation, higher the temperature higher the amount of hydrogen formation.
7. No electrolysis of water occurred during passing the current (within the range tested) through the saline solution, when two aluminum sheets were used as anode and cathode.
8. The amount of hydrogen generated depends on the electrode surface area exposed to the electrolyte.
9. Where both anode and cathode are Al or an Al alloy, for uniform dissolution of both anode and cathode, intermittent reversal of polarity will accomplish the objective.
10. It has been shown that commercial aluminum alloy cans, such as beverage can be easily used to generate hydrogen.
11. The rate of hydrogen generation can be controlled using the strength of the electric current.
12. This system is safe, since hydrogen is produced on demand, there is no stored hydrogen.

Examples Including Results Obtained for the Galvanic Cell System of the Present Invention Preliminary Test In order to investigate the potential of using magnesium metal to generate hydrogen from water initial experiments were carried out by clamping one Mg plate and one stainless plate with a steel clamp and then dipping this combination into salt solutions at 0.4M, 0.8M and 2M NaCl. This immediately produced hydrogen from the water 44 ml, 49 ml, and 85 ml in 30 mins, respectively. Subsequently, other metals, such as Cu, Ni, Al etc., with magnesium metal were tested to generate hydrogen from an aqueous electrolytic solution. These tests were also done with steel clamps for a comparative test to know the efficacy of different systems. For example, in 20 mins. and in 1M NaCl aqueous solution Mg+Cu, Mg+Ni, and Mg+Al generated 28 ml, 38 ml and 62 ml, respectively. These initial tests showed that the best combination for hydrogen generation is Mg+Al. Later on, the plates were connected by spot welding an insulated Pt wire and this produced much more hydrogen. For example, when the two plates (Mg+Al) were joined with a Pt wire, the system generated 73 ml of gas but only 49 ml with a steel clamp in 30 minutes both at 0.8M NaCl solution.

It was observed that Mg—Al produced the maximum amount of hydrogen as compared to all other systems tested. Mg—Al system is even better than Mg—Fe system. For example, Mg—Al system produced 105 ml/hr, vs. 80 ml/hr for Mg—Fe system of the same sample size. This is about 30% more hydrogen generation for Mg—Al system than that of Mg—Fe system. The efficiency of hydrogen gas generation between these two systems: Mg—Al and Mg—Fe is compared in Table 4.

TABLE 4

Hydrogen generation with Mg—Al and Mg—Fe systems

| Time (min.) | $H_2$ formed (in ml) (Mg—Al) | $H_2$ formed (in ml) (Mg—Fe) |
|---|---|---|
| 0 | 0 | 0 |
| 10 | 16 | 11 |
| 20 | 35 | 24 |
| 30 | 54 | 37 |
| 40 | 73 | 50 |
| 50 | 92 | 63 |
| 60 | 105 | 80 |

Experimental Set-up and Materials for More Detailed Investigation

After these preliminary tests, all subsequent tests involve only magnesium metal and its alloys and aluminum metal and its alloys. In this series of experiments three types of magnesium alloys are used. Commercially these are identified as AZ31, AM60B and AZ91D, containing about 3, 6 and 9 wt % aluminum, respectively. For aluminum, baking foil (99% Al) and an aluminum alloy A6061, which contains about 2-wt % of other metals, were used. The chemical constituents of these alloys are shown in Tables 5A and 5B.

TABLE 5A

Chemical composition of the alloys used

| | AZ91D | AM60B | AZ31 |
|---|---|---|---|
| Mg | Balance | Balance | Balance |
| Al | 8.5-9.5% | 5.6-6.4% | 2.5-3.5% |
| Mn | 0.17-0.40% | 0.26-0.50% | 0.2-1.0% |
| Zn | 0.45-0.9% | <0.20% | 0.7-1.3% |
| Si | <0.05% | <0.05% | <0.05% |
| Cu | <0.025% | <0.008% | <0.01% |
| Ni | <0.001% | <0.001% | <0.001% |
| Fe | <0.004% | <0.004% | <0.002% |
| Other each impurity | <0.01% | <0.01% | <0.01% |

TABLE 5B

Composition for Al 6061

| | Al | Cu | Si | Fe | Mn | Mg | Zn | Ti | Cr |
|---|---|---|---|---|---|---|---|---|---|
| Al6061 | Bal. | 0.15-0.4 | 0.4-0.8 | 0.7 | 0.15 | 0.8-1.2 | 0.25 | 0.15 | 0.04-0.35 |

In order to collect the gas generated in the system a circular disc of magnesium about 2 cm diameter and one or more aluminum plates of about 2 cm×2.5 cm were connected with one or more insulated Pt wires by spot welding. This combination was then dipped in an electrolyte containing NaCl and water. An inverted measuring cylinder, filled up with the electrolyte-water solution, was then positioned on the top of the joined metal pieces. Immediately hydrogen started bubbling from both metal (Mg) disk and plate (Al). However, more vigorous bubbling was noted from the Mg disk.

Subsequently, a specimen holder was made from a piece of Teflon. The specimen holder was about 2.3 cm wide, ~1.0 cm thick and ~15 cm long. Three slots of about 1 mm wide and about 2 nun deep were cut on the wide surface and at the center of each slot a hole was drilled to connect all specimens with insulated Pt wires, which could be connected and disconnected from outside the gas collection system. This allowed to start hydrogen generation by connecting the wires and to stop the reaction for hydrogen generation by disconnecting the wires. Positioning the plates and disk in the slots kept the distance between them constant. The gas collection system was essentially an inverted electrolyte-filled measuring cylinder, positioned on the top of the electrodes. The generated gas was collected on the top of the cylinder and recorded visually as a function of time. The surface area of all electrodes was kept constant ~13 cm². A schematic diagram of the system is shown in FIG. 1. The system can be used either with two or three electrodes. The Teflon specimen holder is not shown in the diagram.

Factors Affecting Hydrogen Generation

The variables for studying the systems are selected for the following reasons. The current flowing between two plates of magnesium and aluminum will depend on the total resistance it will encounter. These are: (1) the ion concentration in the electrolyte, which is carrying the current, (2) the relative surface area of the metals, (3) the ohmic resistance of the wire or wires connecting the plates, (4) temperature of the system, as the reaction for generating hydrogen and formation of hydroxides are exothermic and (5) the constituents and composition of the material used for the anode and cathode. On this basis, the following variables were studied to estimate the amount of hydrogen generated in the system.

Variables Tested:
1. Electrolyte concentration
2. External connection resistance between the plates
3. Temperature effect
4. Different Mg alloys
5. On demand $H_2$ generation using (start-stop) Mg—Al system
6. Scale up to 10 cm×20 cm sample size
7. The effect of inter-electrode distance
8. $H_2$ pressure generation through reaction Electrolyte Concentration Almost all the variables were tested with a magnesium alloy # AM60B, which contains 6 wt % aluminum. Three different electrolyte concentrations 0.5, 1.0 and 2.0 M of NaCl in water were used to verify the effectiveness of hydrogen generation using a combination of two aluminum plates and one magnesium plate (in the middle) connected in series (Al—Mg—Al system) having ~13 cm² of surface area each. These plates were connected with insulated Pt wires. The results are shown in Table 6.

TABLE 6

Effect of electrolyte concentration on hydrogen generation at 20° C.

| | NaCl concentration, M | | |
|---|---|---|---|
| | 0.5 | 1.0 | 2.0 |
| Hydrogen Generated in one hr (ml) | 140 | 215 | 410 |

External Connection Resistance Between the Plates

Figure 6:
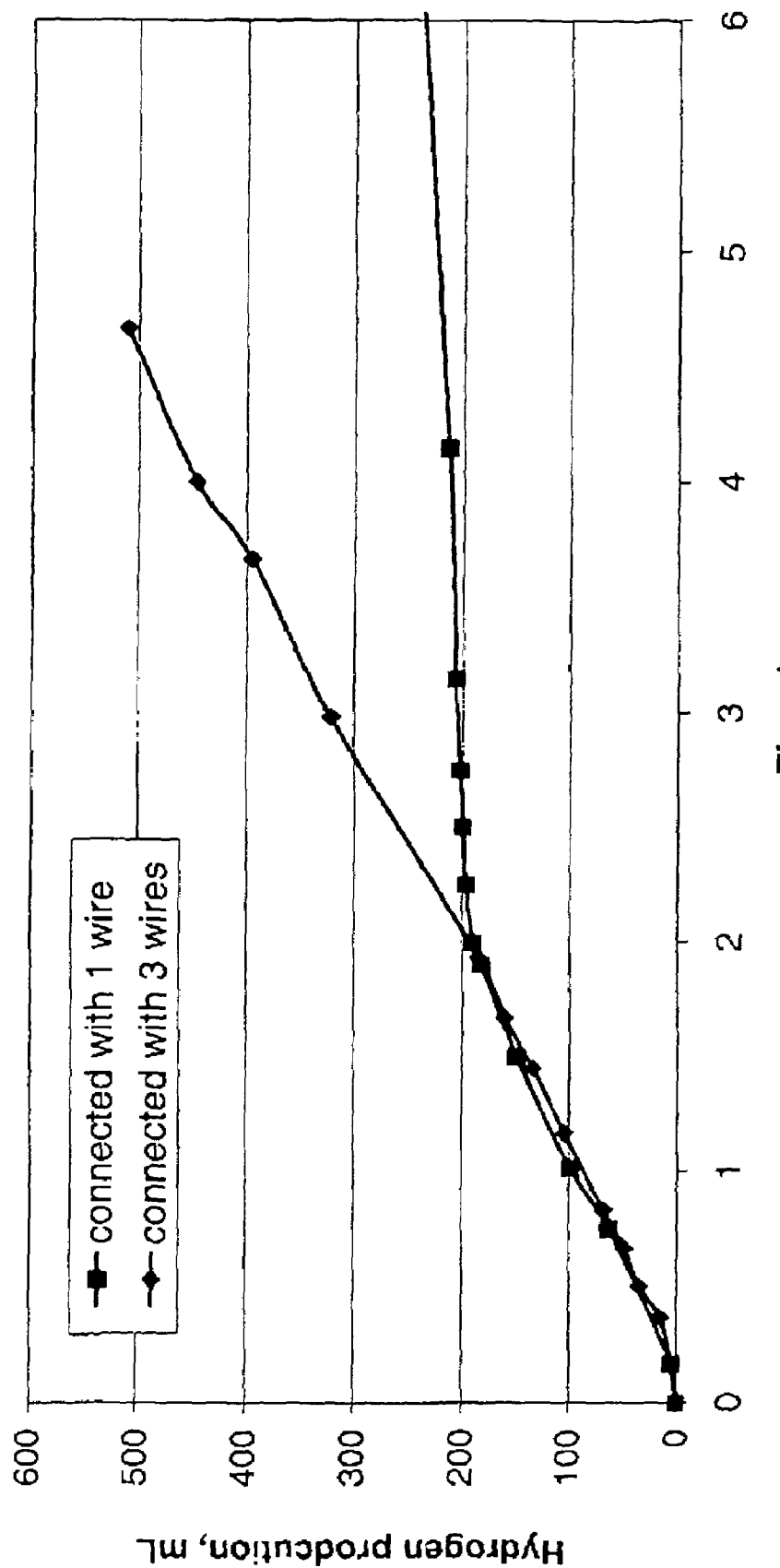
FIG. 6 is a plot showing the effect of ohmic resistance of the connecting circuit in a galvanic cell with an aluminum cathode and a magnesium anode.

It was thought when one thin Pt wire was used to connect the two plates this might be restricting the current flow between the Mg and Al plates. To test this idea one set of magnesium plate and aluminum plate was connected with one Pt wire and a second set was connected with 3 Pt wires. These are tested in 1M NaCl solution at 20° C. and the results obtained are compared in FIG. 6. It can be clearly seen that after some initial similar hydrogen generation behavior from these two systems, (up to ~2 h ), one Pt wire connection restricts further the current flow, which resulted in limited formation of $H_2$ after 2 hours, whereas with 3 wires connection $H_2$ was continuously generated at the same rate up to 5 hours, when the test was stopped.

Temperature Effect

Figure 7:
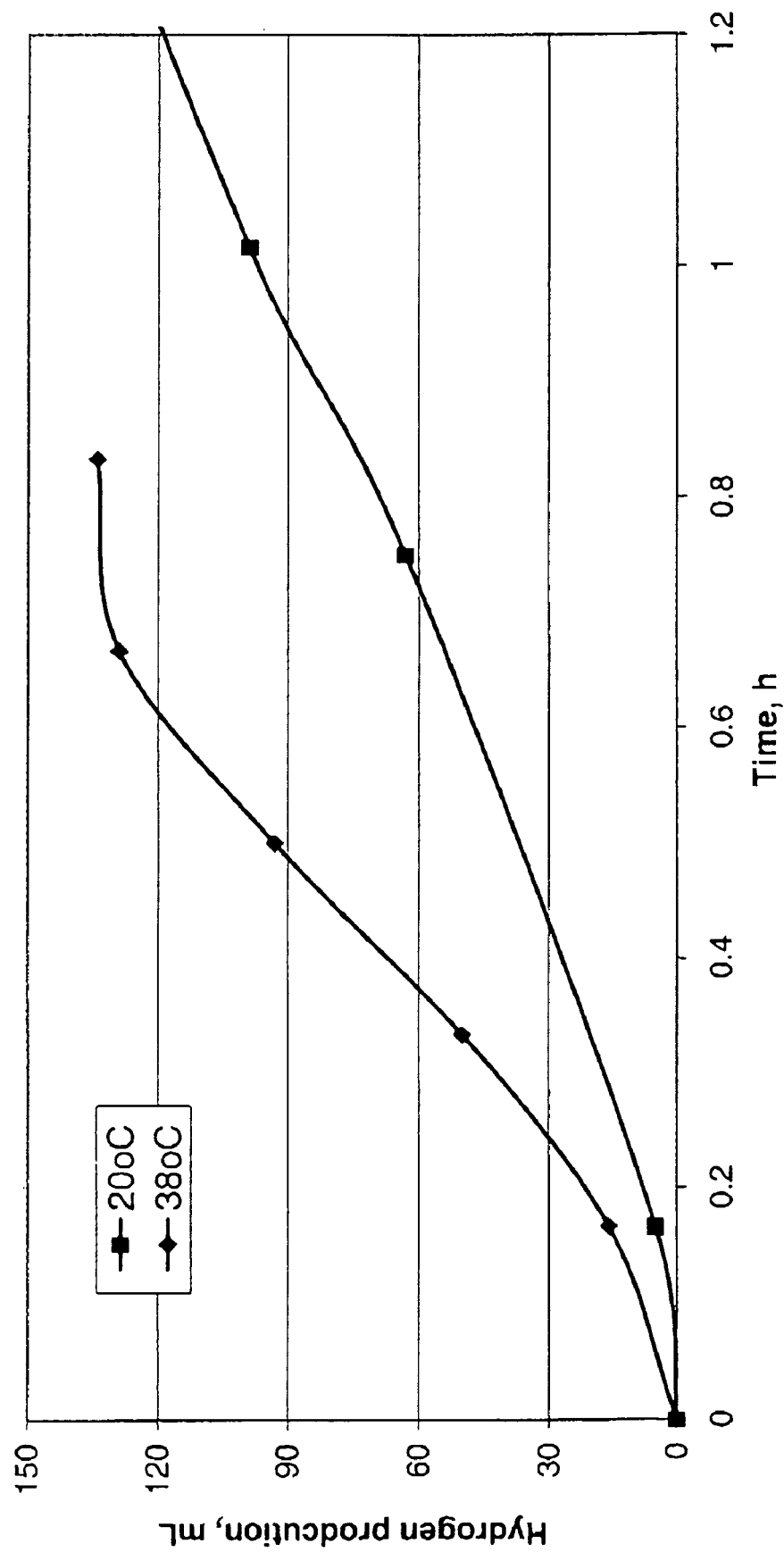
FIG. 7 is a plot showing the effect of temperature in a galvanic cell with an aluminum cathode and a magnesium anode.

Not extensive studies have been carried out on the temperature effect but it was expected that temperature would have significant effect on the hydrogen generation; this can be seen in FIG. 7.

Different Magnesium Alloys

Figure 8:
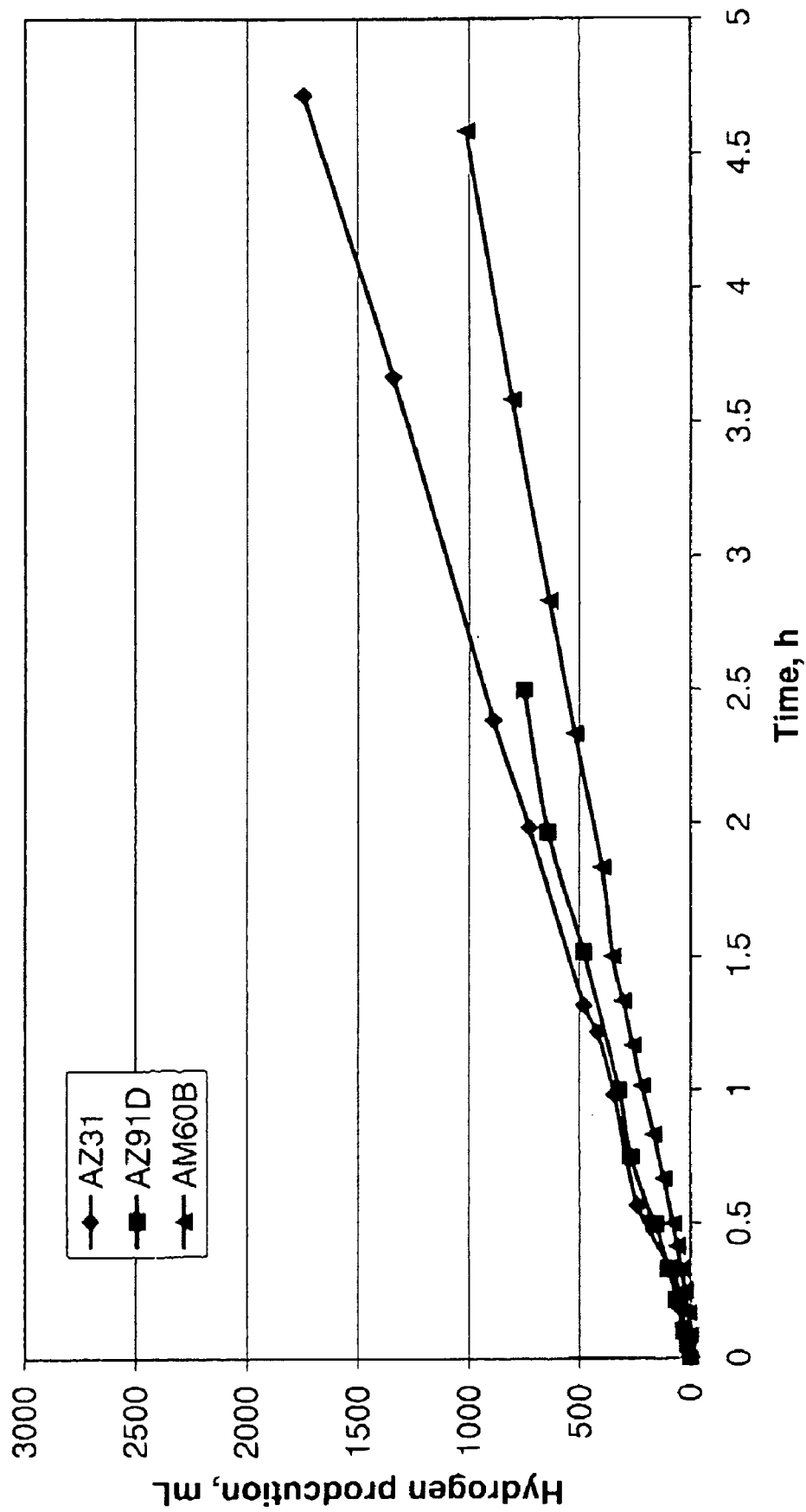
FIG. 8 is a plot of results obtained and provides a comparison of hydrogen production obtained from 3 different known magnesium alloys in a 2 M NaCl solution

Three different magnesium alloys were tested to generate hydrogen under identical condition. These alloys are commercially known as #Az31, #AM60B and #AZ91D, containing about 3, 6 and 9 wt % aluminum. In these tests, two pieces of aluminum A6061 plates were connected with one piece of magnesium plate as Al—Mg—Al configuration. These systems were tested in 2M NaCl solution at 20° C., and the results are compared in FIG. 8.

On Demand $H_2$ Generation Using Mg—Al System

One of the main objectives was that hydrogen generation from water must be on demand. That is when hydrogen is required the system should be able to generate it and when hydrogen is not required, generation must stop. Magnesium being a highly reactive metal, it was decided to determine the self-corrosion behavior of Mg alloys used in this study which resulted in hydrogen generation in 2M NaCl solution at 20° C. The results are shown in Table 7. It can be noted that there is very little hydrogen generation from alloys with higher aluminum content in magnesium in this aqueous electrolyte solution.

TABLE 7

Self-Corrosion Behavior of Mg Alloys

| Alloy | $H_2$ production rate (ml/h/cm²) |
|---|---|
| AZ31 (3 wt % Al) | 0.43 |
| AM60B (6 wt % Al) | 0.055 |
| AZ91D (9 wt % Al) | 0.062 |

Figure 9:
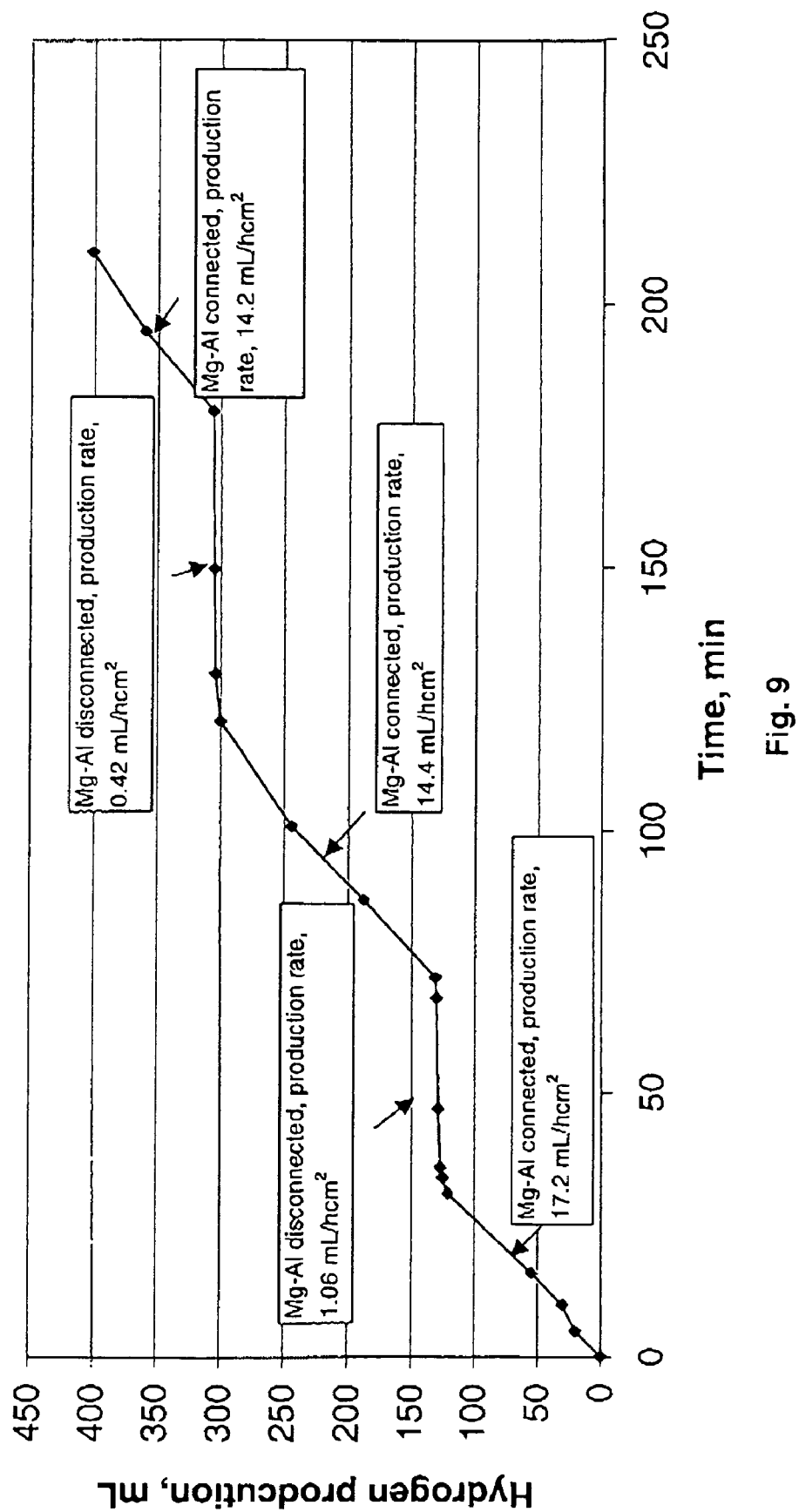
FIG. 9 is a plot of a start-stop test wherein an Mg—Al system with 3 mm between the electrode plates was tested in a 2M NaCl solution by connecting (shorting) and disconnecting the electrical circuit.

Next, tests were carried out to evaluate the possibility of generating hydrogen and stopping the reaction when required. This was done by connecting and disconnecting externally one plate of Mg and two plates of Al placed in 2M NaCl water solution intermittently. When these plates were connected via Pt wires there was significant amount of hydrogen generation from the system. Subsequently, these wires were disconnected and again hydrogen generation was noted. The results are shown in FIG. 9. It can be seen from the figure that there very little hydrogen formation once the electrodes are disconnected, which indicates that the system Mg—Al can be utilized for hydrogen generation on demand thus fulfilling one of the main objectives of this project.

Scale up to the Sample Size of 10 cm×20 cm, and the Effect of Inter-electrode Distance Mg—Al system was tested using Mg AZ31 and Al 6061 sheet (10 cm×20 cm) in 2M NaCl solution using a modified pressure cooker. The AZ31 was connected with 2 pieces of Al 6061 sheet on both sides using 4 stainless steel screws. The plate space was set at two different distances (3 and 6 mm) in order to study the effect of inter-electrode resistance. Automatic data acquisition for gas volume and temperature was used. The results are shown in Table 8. From the above results, it is found that the plate spacing has an obvious effect in the production rate.

TABLE 8

Effect of inter-electrode distance

| | Plate space | |
|---|---|---|
| | 3 mm | 6 mm |
| Surface area | 432 cm² | 432 cm² |
| Production rate, l/hcm² | 33.3 | 23 |

TABLE 8-continued

Effect of inter-electrode distance

| | Plate space | |
|---|---|---|
| | 3 mm | 6 mm |
| $H_2$ volume, l | 178.40 | 162.40 |
| AZ31 approximate weight loss, g | 74.61 | 67.27 |
| Al6061 approximate weight loss, g | 62.30 | 64.58 |
| Temperature | Max. 64° C. | Max. 55° C. |

H2 Pressure Generation Through Reaction

Figure 10:
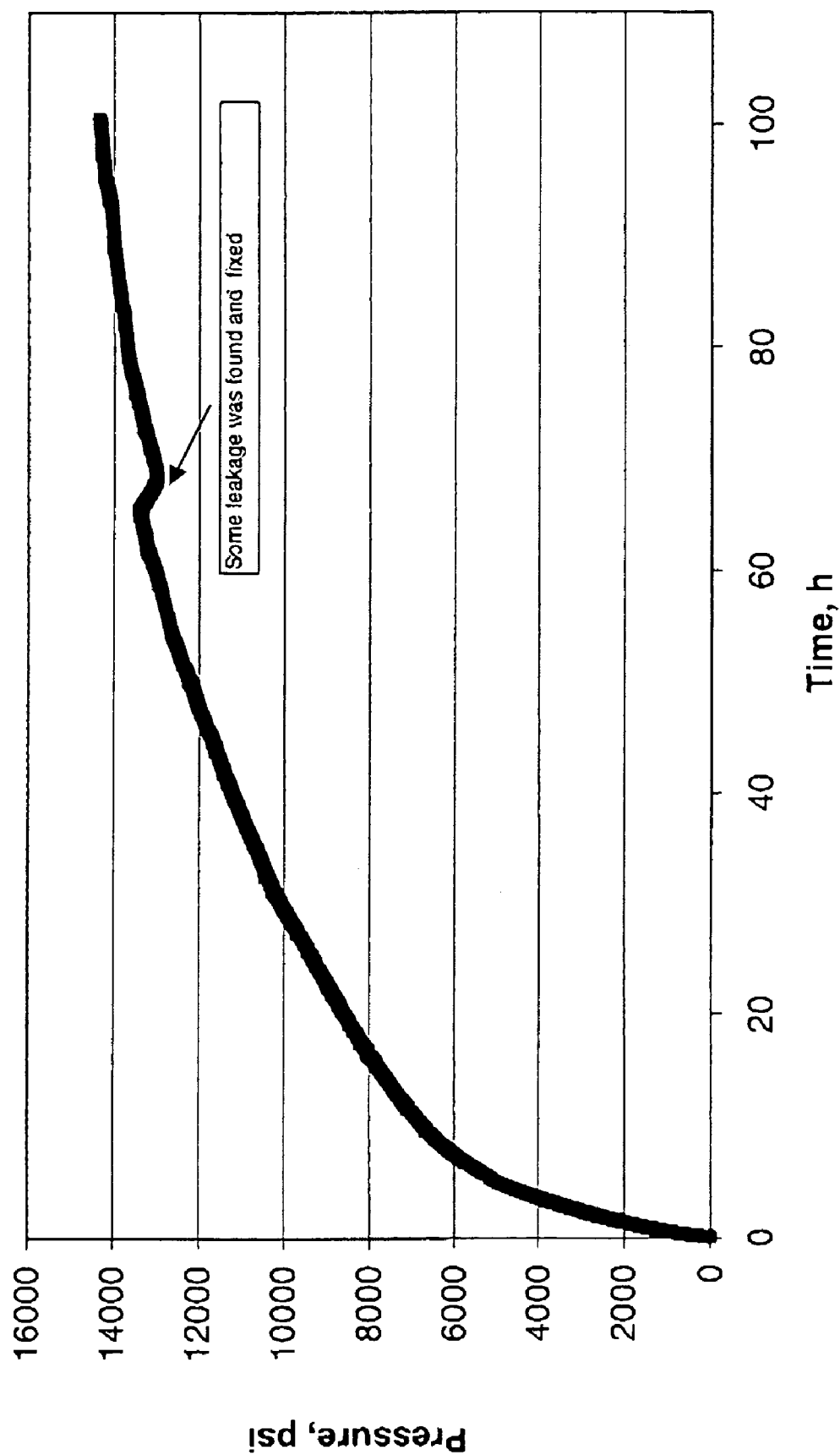
FIG. 10 is a plot showing hydrogen pressure generation in Mg—Al system.

The $H_2$ pressure generated by this technique was tested in pressure vessel connected with pressure transducer and data acquisition systems. The Al(Al6061)-Mg(AZ31)-Al (Al6061) specification was used, and the effective surface area of Mg and Al is 32 cm². FIG. 10 show the $H_2$ pressure and time relationship. Due to the test limit of the pressure vessel, the test was interrupted at the pressure of 14341 psi. The $H_2$ pressure generated by this technique could be even higher as at the end point the pressure was still climbing.

Gas analysis

Mass spectrometric analyses on the collected gas were done and it was shown that the gas contains over 99% hydrogen gas.

Reaction Product

The colloid material formed in the system when hydrogen gas was generated was collected and filtered and dried. Prom the x-ray analysis of the powder, it was concluded that the by-product of reaction is aluminum monohydrate (Boehmite) and magnesium hydroxide, formed by the following reactions.

$$Mg+2H_2O \rightarrow Mg(OH)_2+H_2$$

$$Al+2H_2O \rightarrow AlOOH+3/2H_2$$

Explanation for H2 Evolution from Al—Al and Mg—Al Electrode System

Anodic Reaction

The principles for Mg—Al or Al—Al system to generate hydrogen are similar. In Mg—Al system, Mg and Al consists a galvanic cell with Mg as anode due to its high active and galvanic series and Al as a cathode. Anodic Mg served as electron donator, and the corrosion reaction can be written as $$Mg-2e=Mg^{2+} \ (E^0=-2.37V)$$

Followed by a precipitation reaction:

$$Mg^{2+}2OH^- \rightarrow Mg(OH)_2$$

The combined dissolution reaction is $$Mg+2OH^-=Mg(OH)_2+2e$$

In addition to the above current generating reaction, the anode still undergoes a hydrogen-evolving corrosion process. This parasite chemical corrosion reaction on Mg anode can be expressed as $$Mg+2H_2O=Mg(OH)_2+H_2$$

The self-corrosion reaction leads to a large amount of $H_2$ evolution on Mg anode while the Mg itself was consumed, which consist the base for $H_2$ generation by Mg—Al system.

As can be seen, in Mg—Al system, the driving force was supplied from the Mg—Al galvanic cell due to the corrosion reaction. But, In Al—Al system, the driving force for Al anode dissolution is the applied electric field. When Al was employed as the anode, the anodic dissolution can be expressed as Al$-3e$=Al$^{3+}$ $E$=$-1.66$V vs. SHE Parasitic reaction for anodic process could be:

$$H^+ + e = \frac{1}{2}H_2$$
$$E = -0.414 \text{ vs. } SHE (\text{PH} = 7)$$

Figure 4:
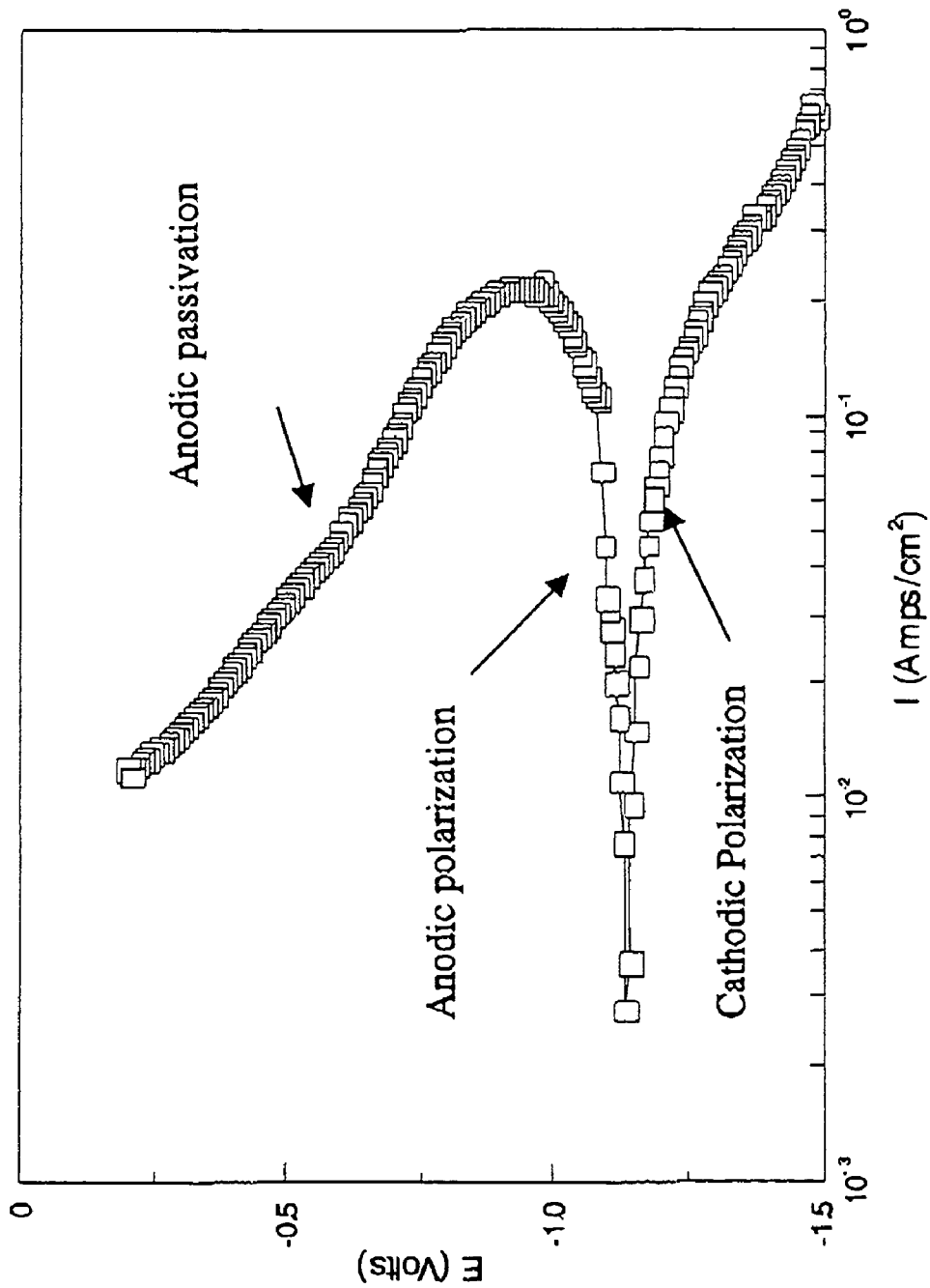
FIG. 4 show anodic and cathodic polarization curve on an Aluminum electrode.

As a result, a mixed potential positive than $-1.66$ was observed. FIG. 4 demonstrates an experimental polarization curve for anodic process, with a mixed potential, $E_{corr}$= $-1.134$ vs. SCE, was obtained. The parasitic $H_2$ evolution reaction on anode contributes to the total $H_2$ generation for Al—Al system to some extent.

Comparing with other Al-Metal systems, for instance, Pt served as anode, the anode reaction is $O_2$ evolution $$\frac{1}{2}O_2 + H_2O + 2e = 2OH^-$$
$$E^0 = 0.401 \text{ V } vs. \text{ SHE}$$

Due to high oxygen evolution over-potential, much higher cell voltage and subsequently higher energy consumption is required to accomplish the anode reaction. Mixed potential for Al anode depolarization reaction significantly reduces the energy requirement for $H_2$ generation in Al—Al system, which is one of unique features for present invention.

Figure 5:
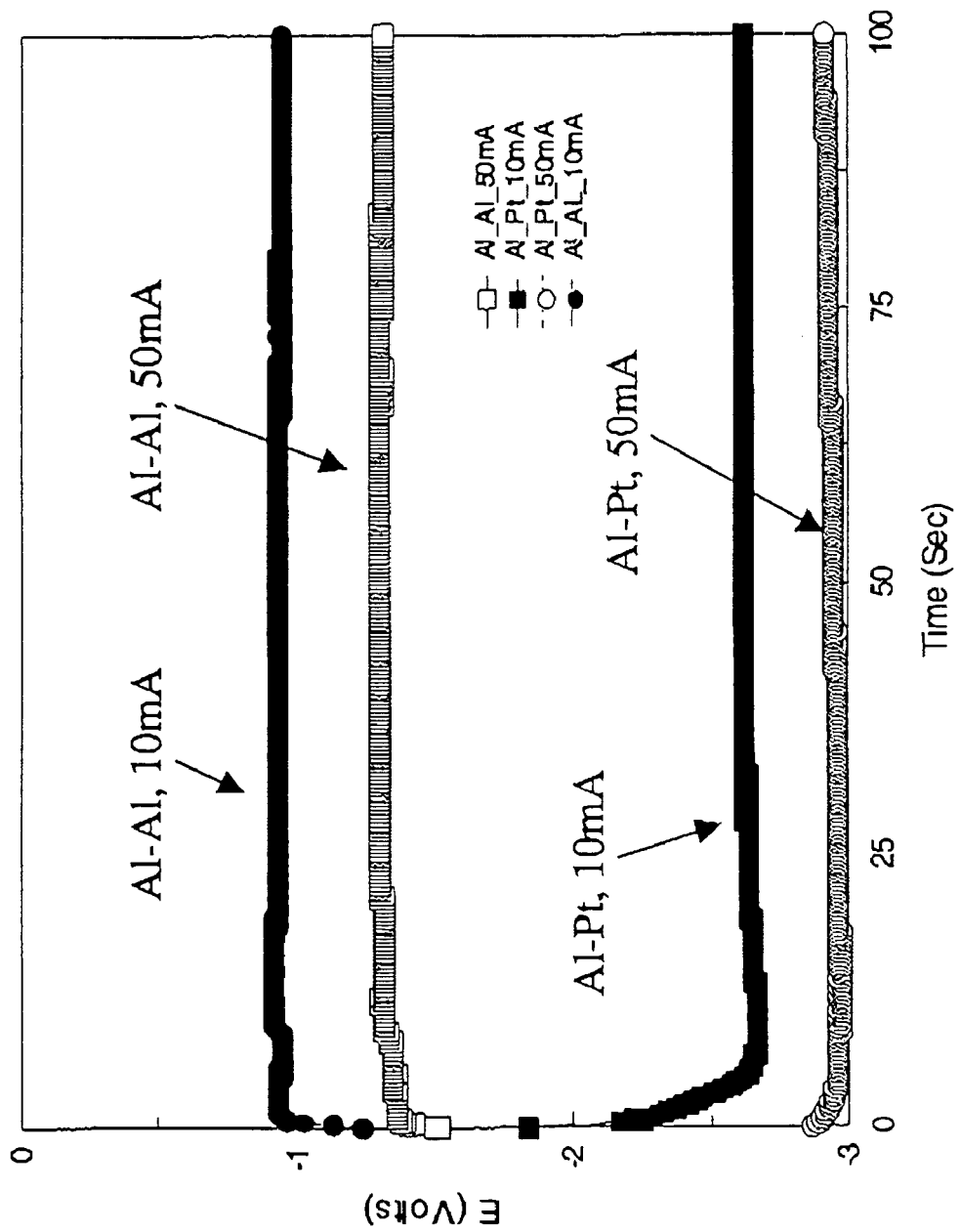
FIG. 5 is a plot of cell voltage showing a comparison for an Al—Al and an Al—Pt system under current of 10 mA and 50 mA

FIG. 5 shows the cell voltage variation with Al as both cathode and anode. Compared with Al cathode and Pt anode, where the cell voltage is 2.86V at 50 mA and 2.61V at 10 mA, a much lower cell potential, 1.35V at 50 mA and 0.98V at 10 mA, is obtained for Al—Al system. From these results, using Al as anode and cathode is promising in lowering voltage and saving energy for $H_2$ generation.

Cathodic Reaction

In both Mg—Al and Al—Al system, the cathodic reaction is same. The difference is that the electrons come from Mg—Al galvanic cell in the Mg—Al system, and the electrons were supplied by external DC source in Al—Al system. When Al is used as the cathode, aluminum surface film first undergoes a chemical dissolution during hydrogen evolution because the surface becomes alkaline according to H$_2$O+e→OH$^-$+1/2H$_2$ Once the surface oxide film was destroyed, the chemical attack of bared Al by water proceeds via reaction Al+2H$_2$O→AlOOH+3/2 H$_2$ The chemical dissolution from Al cathode guarantees much high $H_2$ generation than usual cathodic reduction on inert electrodes, which makes the $H_2$ generation by Mg—Al and Al—Al systems unique as compared to any other traditional Mg—Pt or Mg-stainless (inert cathode) systems.

In Al—Al system, the $H_2$ generation rate can be adjusted by controlling external electric current. But, the driving force for $H_2$ generation in Mg-metal system depends on anode and cathode corrosion potential, and the corrosion current is basically determined by $i_g=(E_c-E_a)/(R_a+R_c+R_s)$ where $i_g$ is the galvanic current between the anode and the cathode, $E_c$ and $E_a$ are the equivalent potentials of the cathode and anode, $R_c$ and $R_a$ are the cathode resistance and anode resistance respectively, and $R_s$ is the resistance of the solution between the anode and cathode. Any factor that can affect these parameters will influence the corrosion potential and then galvanic corrosion rate. High anodic oxide film resistance will results in a low the galvanic current density and sluggish $H_2$ evolution at beginning. With the anodic film broken-down, the galvanic current and then the $H_2$ generation rate of Mg—Al system will be facilitated. Proper anodic/cathodic effective area ratio will balance the cathode and anode current density to remove the anode oxide film effectively and then maximize the $H_2$ generation rate. Changing inter-electrode distance or using electrolyte with high conductivity, for instance, 2M NaCl in water, can also maximize the corrosion rate and increased $H_2$ generation rate. These account for the effects of various parameters on hydrogen generation rate.

CONCLUSIONS

1. Mg—Al system has a higher hydrogen production rate than Mg-other metal systems.
2. Reducing external circuit resistance increases hydrogen production.
3. Inter-electrode distance affects the rate of hydrogen production as it affects internal resistance of the system. Reducing the distance increases hydrogen production, however, at very small distances the by-product deposition clogs the system and reduce hydrogen production.
4. Conductivity and hence the concentration of electrolyte in water has significant impact on hydrogen production rate.
5. The hydrogen production could be stopped after disconnecting Mg and Al electrodes and could be restarted after reconnecting Mg and Al electrodes.
6. Both Mg and Al lose weight during hydrogen production. Theoretical calculation indicated that Mg and Al cooperate to produce $H_2$ gas.
7. The system is environmentally friendly and safe.
8. The byproducts are inert and non-toxic. The byproducts may be recycled into both Mg and Al metal from the hydroxides formed as byproduct.

Having described the invention, modifications will be evident to those skilled in the art without departing from the scope of the invention as defined in the appended claims.

We claim:

1. An apparatus for generating hydrogen gas from water, comprising a container containing a water based electrolyte, an anode electrode and a cathode electrode positioned in spaced relationship in said electrolyte in said container to provide a cell, a controlling electric circuit electrically interconnecting said electrodes, an accumulator space for collecting hydrogen generated by said system and wherein said cathode is formed from aluminum or an aluminum alloy and wherein said cell is a galvanic cell and said anode is formed from magnesium or magnesium alloy.

2. An apparatus for generating hydrogen gas as defined in claim 1 wherein said electrolyte is sodium chloride aqueous solution.

3. An apparatus for generating hydrogen gas as defined in claim 1 wherein said electrodes are in the form of a sandwich with an electrical insulating layer there between.

4. An apparatus for generating hydrogen gas as defined in claim 3 wherein said sandwich is rolled up to a substantially cylindrical shape.

5. An apparatus as defined in claim 1 wherein the controlling electric circuit includes an on-off switch.

6. An apparatus as defined in claim 5 wherein the spaced relationship of up to 6 mm.

7. An apparatus as defined in claim 6 wherein the electrolyte is sodium chloride aqueous solution of a concentration of 0.5 to 2 M.

8. An apparatus as defined in claim 7 wherein the spaced relationship is in the range of 3 to 6 mm.

9. An apparatus as defined in claim 8 wherein the anode is formed from magnesium or a magnesium alloy containing from 3 to 9 %/w of aluminum and the cathode is formed from aluminum or an aluminum alloy containing 98-99%/w of aluminum.

10. An apparatus as defined in claim 9, wherein the anode and cathode are electrically connected by a conducting wire.

11. A method for generating hydrogen gas from water, comprising a immersing an anode electrode and a cathode electrode positioned in spaced relationship in a water based electrolyte to provide a cell, said cathode being formed from aluminum or an aluminum alloy, providing a controlling flow of electric current between said electrodes and collecting hydrogen generated, and wherein said cell is a galvanic cell and said anode is formed from magnesium or a magnesium alloy.

12. A method as defined in claim 11, wherein the electrolyte is sodium chloride aqueous solution of a concentration of 0.5-2 M.

13. A method as defined in claim 12, effected at a temperature of 20 to 60° C.

14. A method as defined in claim 13, wherein the anode is formed from magnesium or a magnesium alloy containing 3 to 9%/w of aluminum and the cathode is formed from aluminum or an aluminum alloy containing 98-99 %/w of aluminum.

15. A method as defined in claim 14, wherein hydrogen generation is controlled by a corrosion current determined by $$i_g = (E_c - E_a)/(R_a + R_c + R_s)$$

where $i_g$ is the galvanic current between the anode and cathode, $E_c$ and $E_a$ are the respective potentials of the cathode and anode, $R_c$ and $R_a$ are the cathode and anode resistance, respectively and $R_s$ is the resistance of the solution between the anode and cathode.

16. A method as defined in claim 12, wherein the anode and cathode are electrically connected by a conducting wire.

17. A method as defined in claim 16, wherein the spaced relationship is up to 6 mm.

18. A method as defined in claim 16, wherein the spaced relationship is 3 to 6 mm.

* * * * *